Patented Mar. 30, 1943

2,314,968

UNITED STATES PATENT OFFICE 2,314,968

PROCESS OF IMPREGNATING TEXTILE MATERIALS AND THE MATERIAL THUS OBTAINED

Herbert Bestian and Georg von Finck, Frankfort-on-the-Main, Germany, assignors, by mesne assignments, to General Aniline & Film Corporation, New York, N. Y., a corporation of Delaware No Drawing. Application April 27, 1940, Serial No. 332,014. In Germany May 27, 1939

8 Claims. (Cl. 117—145)

The present invention relates to a process of impregnating textile materials and to the material thus obtained, and it especially relates to textile materials having a soft feel and water-repellent properties.

We have found that textile materials may be improved by impregnating the materials with compounds of the general formula:

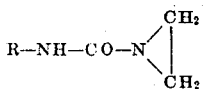

and the homologues and derivatives thereof, wherein R means a member of the group consisting of aliphatic and isocyclic radicals of at least 10 carbon atoms, and then polymerizing the monomeric compound. By this treatment a material is obtained which has a soft feel and possesses water-repellent properties, the impregnation being to a high degree resistant to washing, boiling and to the action of benzine.

The polymerizable products used which are to be considered as substituted ureae are obtained from the corresponding isocyanates by the reaction with ethyleneimine or the homologues or derivatives thereof. There are especially suitable the ureae which may be prepared from fatty isocyanates, for instance octadecyl-isocyanate or heptadecyl-isocyanate, isocyanate produced from palm nut oil or isocyanates on the base of synthetic fatty acids and the like. But for the preparation of such polymerizable ureae there are likewise suited isocyanates containing in the alkyl radical hetero-atoms or hetero-atom groups such as O, S, N, CO, O.CO, NR, NR.CO, SO$_2$, NR.SO$_2$ and the like, R standing for hydrogen or a hydrocarbon radical, for instance cetyloxy-ethylisocyanate C$_{16}$H$_{33}$.O.C$_2$H$_4$.NCO, dodecyl-methylamino-ethylisocyanate, stearoyl-oxyethyl-isocyanate, octodecylthio-ethylisocyanate, stearoylmethylamidoethylisocyanate, compounds of the formula R—SO$_2$—N(CH$_3$).C$_2$H$_4$.NCO, wherein R—SO$_2$ means the radical of a sulfochloride which is obtained by the simultaneous action of sulfurdioxide and chlorine on aliphatic saturated hydrocarbons. Furthermore, there are suitable the products which are obtained by the reaction of araliphatic isocyanates which may, if necessary, contain the above-mentioned hetero-atoms or hetero-atom groups with ethyleneimine or the homologues thereof, for instance paradodecylphenylisocyanate or para-octadecylphenylisocyanate, octodecyl-oxyphenylisocyanate, stearoyl-oxyphenylisocyanate, para-N-octodecyl-N-methylaminophenylisocyanate, para-N-stearoyl-N-methyl-aminophenylisocyanate.

Fibrous materials of vegetable or animal origin in the form of fibers, yarns or tissues may be treated with the afore-named derivatives of urea; synthetically prepared fibers, yarns or tissues of every kind, for instance those prepared from regenerated cellulose or cellulose derivatives are likewise suitable for the treatment.

The textile materials may be impregnated with the solutions of the polymerizable ureae in organic solvents or with aqueous dispersions by immersing or spraying them or treating them in any other similar manner. By a subsequent polymerization, if required with application of heat, the ureae first present on the fiber or in the fiber in the monomeric form are transformed into the insoluble state. In this form they have a good hydrophobic and softening effect on the textile material. This effect is maintained even after a repeated washing of the material. The polymerization may be performed according to the process described in the co-pending U. S. application Serial No. 322,031 filed March 2, 1940, by Herbert Bestian for "Polymerization products." The degree of the water-repellent and softening effect may be influenced by the choice and quantity of the urea derivative applied to the material, by the temperature and duration of the subsequent heat-treatment and by suitable additions. It is possible to modify the finishing effect in any desired manner by simultaneously using other dressing agents, such as plastic materials or the emulsions thereof, softening agents, preparations containing starch, loading materials, filling materials, cellulose derivatives, emulsions of fats, higher alcohols, and the like.

The following examples serve to illustrate the invention, but they are not intended to limit it thereto:

(1) A tissue of artificial silk or cotton is treated for a short time in a solution of carbon tetrachloride containing per liter 20 grams of N-octadecyl-N'-N'-ethylene-urea of the formula:

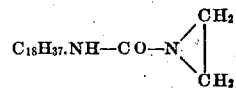

then centrifuged, dried and finally heated for 15 minutes to 140° C. The tissue thus treated has an excellently soft feel and shows a good water-repellency. The softening effect and the water-repellency are maintained even after a repeated washing with soap, with soap and sodium carbonate, with benzine or with other washing and cleansing agents.

(2) A tissue of artificial silk staple fiber, wool or a mixture of these two fibrous materials is treated for 10 minutes in a benzine solution containing per liter 10 grams of N-dodecyl-N'.N'-ethylene-urea of the formula

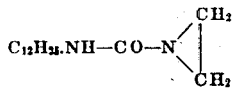

The material is then centrifuged and after the solvent has been evaporated it is heated for 30 minutes to 95° C. The softening and hydrophobic effect is very stable.

(3) Yarn or tissue of artificial silk or artificial silk staple fiber is impregnated in a solution of methylene chloride containing per liter of methylene chloride 10 grams of N-heptadecyl-N'.N'-ethylene-urea of the formula:

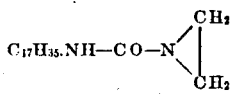

The material is then centrifuged and after the evaporation of the solvent it is heated for 30 minutes to 110° C. The artificial silk or artificial silk staple fiber thus treated has an excellently soft feel which is maintained after a repeated washing with soap, soap and sodium carbonate, benzine or other washing and cleansing agents.

(4) 1 kilogram of N-octadecyl-N'.N'-ethyleneurea is mixed with 1 liter of a solution of 10 per cent. strength of the reaction product of 6 mols of ethylene oxide on 1 mol of iso-octylphenol and the mixture is ground in a suitable device until a fine suspension is obtained. A tissue of artificial silk or artificial silk staple fiber is impregnated in a padding machine with an aqueous solution containing per liter 10 grams of the afore-named suspension. The material is then dried for 1 hour at 100° C. to 110° C. The tissue has an excellently soft feel and a good water-repellency. The effect is maintained even after a repeated washing with soap, soap and sodium carbonate, benzine or other washing and cleansing agents.

(5) A tissue of wool, artificial silk staple fiber, natural silk or of a mixture of these fibrous materials is impregnated in a padding machine in a suspension containing per liter of water 5 grams of N-para-dodecyl-phenyl-N'.N'-ethylene urea of the formula:

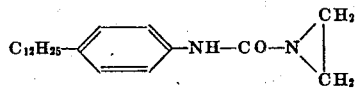

The material is then dried for 1 hour at 80° C. to 85° C. The hydrophobic and softening effect shows an excellent stability. The material may also be dried at a lower temperature than 80° C. to 85° C., if necessary at room temperature, a longer drying period than 1 hour being then required.

(6) 1 kilogram of N-heptadecyl-N'.N'-ethylene urea of the formula

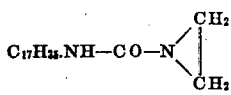

is mixed with 100 grams of the reaction product of 30 mols of ethylene oxide on 1 mol of oleyl alcohol, the mixture is caused to melt at 55° C.–65° C. and then diluted first with hot water and then with cold water, while stirring. Tissue or yarn of artificial silk or artificial silk staple fiber is treated for 10 minutes in an aqueous suspension obtained as described above and containing per liter of water 10 grams of N-heptadecyl-N'.N'-ethylene urea. The material is centrifuged and then dried for 1 hour at 80° C. to 100° C. The yarn and tissue thus treated has a soft feel and a good hydrophobic effect. The impregnation is resistant to washing to a large extent.

(7) 1 kilogram of N-octadecyl-N'.N'-ethylene urea of the formula

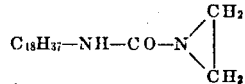

is mixed with 1 liter of an aqueous solution of 5 per cent strength of oleic acid methyl taurine and the mixture is ground in a suitable apparatus until a fine-grained suspension readily capable of being diluted with water is obtained. Tissue of artificial silk or artificial silk staple fiber is impregnated in a padding machine in an aqueous liquor containing per liter 6 grams of the suspension obtained as described above. The tissue is then dried at 70° C. to 80° C. A softening and water-repellent effect has been imparted to the tissue by the treatment herein described and the impregnation possesses a good resistance to washing.

(8) A tissue of artificial silk staple fiber, cotton or linen is impregnated in a padding machine in a liquor containing per liter of water 20 grams of the suspension described in Example 4 and 25 grams of polyvinyl acetate likewise in the form of a suspension. The tissue is then dried for half an hour at 100° C. to 110° C. The tissue thus treated has a full feel and a good water-repellency, the impregnation being to a large extent resistant to washing.

(9) A tissue of artificial silk is impregnated in a solution of carbon tetrachloride containing per liter 10 grams of N-octodecyl-N'.N'-ethylene urea and 2 grams of the interpolymerization product from maleic anhydride and octadecylvinylether. The tissue is then centrifuged and after the solvent has been evaporated it is heated for 20 minutes to 140° C. The tissue of artificial silk has a very good water-repellent effect which to a very large extent is resistant to washing, boiling and benzine.

(10) 10 grams per liter of N-octadecyl-N'.N'-ethylene urea are finely subdivided in a solution containing per liter 150 grams of a water soluble condensation product of urea and formaldehyde and 5 grams of lactic acid. A tissue of artificial silk is impregnated in a padding machine with the suspension thus obtained and then dried for 20 minutes at 140° C. The tissue of artificial silk thus treated is strongly water-repellent and this effect is maintained to a large extent after the material has been washed by boiling or with benzine.

(11) 40 grams per liter of a suspension containing 25 per cent of the compound of the formula

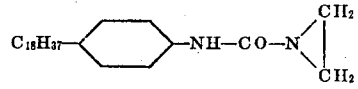

and 2 percent of the condensation product from 20 mols of ethylene oxide and a mixture of alkylphenols prepared by condensing phenol with a mixture of olefines containing 12 to 14 carbon atoms and produced by dehydrating and subsequently dimerising the higher alcohols obtained as by-products in the reduction of carbon monoxide, are used for impregnating tissues or yarns of cotton and artificial silk staple fiber. After having squeezed or centrifuged the textile material it is dried for 1-2 hours at 110° C. A material is obtained having excellent water-repellent properties and an agreeable, soft feel.

(12) 40 grams per liter of a suspension containing 25 per cent of N-octodecyloxyphenyl-N'-N'-ethylene-urea and 2 per cent of the condensation product from 30 mols of ethylene oxide and oleyl alcohol are used for impregnating loose artificial silk staple fiber. After an impregnation period of 10-20 minutes the material is centrifuged or squeezed and then dried at 70° C.-80° C. A soft and water-repellent material is obtained which may readily be spun and which keeps its soft feel and the water-repellent properties after having been spun, sized, woven and de-sized or cleansed.

(13) 40 grams per liter of a suspension containing 25 per cent of N-octodecyl-N'-N'-ethylene-urea and 1.5 per cent of the condensation product from 30 mols of ethylene oxide and oleyl alcohol and 2 per cent octodecyloxymethyldimethylamino-acetic acid are used for impregnating yarn or tissue of artificial silk, artificial silk staple fiber or natural silk. After the material has been impregnated it is squeezed and dried at 50° C.-90° C. until the water has evaporated. Heating may be continued for some time, for about 20 to 30 minutes at 90° C. to 110° C. A softening and hydrophobic effect of a good resistance to washing is obtained.

We claim:

1. The process which comprises impregnating textile materials with a member of the group consisting of monomeric compounds of the general formula

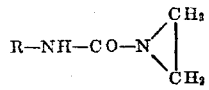

and the homologues and derivatives thereof, wherein R means a member of the group consisting of aliphatic and isocyclic radicals of at least 10 carbon atoms, and then polymerizing the monomeric compound.

2. The process which comprises impregnating textile materials with N-heptadecyl-N'.N'-ethylene urea and then polymerizing the monomeric compound.

3. The process which comprises impregnating textile materials with N-octadecyl-N'.N'-ethylene urea and then polymerizing the monomeric compound.

4. The process which comprises impregnating textile materials with N-octadecylphenyl-N'.N'-ethylene urea and then polymerizing the monomeric compound.

5. Textile material obtained by impregnating with a member of the group consisting of monomeric compounds of the general formula

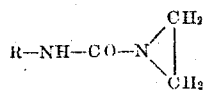

and the homologues and derivatives thereof, wherein R means a member of the group consisting of aliphatic and isocyclic radicals of at least 10 carbon atoms, and then polymerizing the monomeric compound, which material has a soft feel and is water-repellent.

6. Textile material showing water-repellency and having a soft feel obtained by impregnating with N-hepta-decyl-N'.N'-ethylene urea and then polymerizing the monomeric compound.

7. Textile material showing water-repellency and having a soft feel obtained by impregnating with N-octa-decyl-N'.N'-ethylene urea and then polymerizing the monomeric compound.

8. Textile material showing water-repellency and having a soft feel obtained by impregnating with N-octa-decylphenyl-N'.N'-ethylene urea and then polymerizing the monomeric compound.

HERBERT BESTIAN.
GEORG von FINCK.